United States Patent
Belpaire (10) Patent No.: US 7,726,442 B2
(45) Date of Patent: Jun. 1, 2010

(54) BAFFLE EQUIPPED WITH FLAP ASSEMBLY

(75) Inventor: Vincent Belpaire, Forest (BE)

(73) Assignee: Sika Technology AG, Baar (CH)

( * ) Notice: Subject to any disclaimer, the term of this patent is extended or adjusted under 35 U.S.C. 154(b) by 118 days.

(21) Appl. No.: 11/822,962

(22) Filed: Jul. 11, 2007

(65) Prior Publication Data

US 2009/0078495 A1      Mar. 26, 2009

Related U.S. Application Data (63) Continuation of application No. 10/499,200, filed as application No. PCT/EP02/14269 on Dec. 14, 2002, now abandoned.

(30) Foreign Application Priority Data

Dec. 19, 2001    (EP)    ................................. 01130188

(51) Int. Cl.
    *F01N 1/16*  (2006.01)
(52) U.S. Cl. ....................... 181/237; 181/204; 181/205; 296/193.06
(58) Field of Classification Search ................. 181/204, 181/205, 237; 296/193.06
    See application file for complete search history.

(56) References Cited

U.S. PATENT DOCUMENTS

| | | | |
|---|---|---|---|
| 3,730,216 A * | 5/1973 | Arnett et al. ................. | 137/588 |
| 4,083,595 A | 4/1978 | Maier | |
| 4,976,067 A | 12/1990 | Maass | |
| 5,243,153 A | 9/1993 | Holwerda | |
| 5,456,516 A | 10/1995 | Alexander et al. | |
| 5,557,078 A | 9/1996 | Holwerda | |
| 5,603,304 A | 2/1997 | Matczak | |
| 5,720,487 A | 2/1998 | Kato | |
| 5,806,139 A | 9/1998 | Anderson et al. | |
| 5,941,597 A * | 8/1999 | Horiuchi et al. ......... | 296/203.01 |
| 6,065,564 A * | 5/2000 | Uegane ....................... | 181/237 |
| 6,070,928 A | 6/2000 | Campbell | |
| 6,146,565 A * | 11/2000 | Keller ........................ | 264/46.5 |
| 6,244,601 B1 | 6/2001 | Buchholz et al. | |

(Continued)

FOREIGN PATENT DOCUMENTS

EP    0 453 777 A2    10/1991

(Continued)

*Primary Examiner*—Jeffrey Donels
*Assistant Examiner*—Forrest M Phillips
(74) *Attorney, Agent, or Firm*—Oliff & Berridge, PLC (57) ABSTRACT

The present invention relates to an acoustic baffle device for sealing a cavity of a vehicle body at a predetermined cross section of the cavity, comprising a piece of sealing material that is formed in a shape corresponding to but being smaller than the shape of the cross section of the cavity. The acoustic baffle device of the invention is characterized in having a flap assembly having a lower neck defining a passage for a flexible tube or a similar device, said lower neck having a flap secured in closed position by a locking device and being connected preferably to the lower end of the lower neck through means that permit the reversible opening of the above-defined passage. Furthermore, the present invention relates to a flap assembly useful for such an acoustic baffle device, and to a process for sealing a cavity of a vehicle body at a predetermined cross section of the cavity.

31 Claims, 9 Drawing Sheets

U.S. PATENT DOCUMENTS

| | | |
|---|---|---|
| 6,413,611 B1 * | 7/2002 | Roberts et al. .............. 428/99 |
| 6,649,243 B2 | 11/2003 | Roberts et al. |
| 6,733,068 B2 * | 5/2004 | Dogan et al. .............. 296/205 |
| 6,988,585 B2 | 1/2006 | Mourieras et al. |
| 2005/0082111 A1 | 4/2005 | Weber |
| 2008/0143147 A1 * | 6/2008 | Lee .............. 296/193.06 |

FOREIGN PATENT DOCUMENTS

| | | |
|---|---|---|
| EP | 0 679 501 A1 | 11/1995 |
| JP | A-09-156536 | 6/1997 |
| WO | WO 01/24989 A1 | 4/2001 |

* cited by examiner

BAFFLE EQUIPPED WITH FLAP ASSEMBLY

This is a Continuation of application Ser. No. 10/499,200 filed Sep. 24, 2004, which in turn is a National Stage Application of PCT/EP02/14269 filed Dec. 14, 2002, which in turn claims the benefit of European Patent Application No. 01130188.4, filed Dec. 19, 2001. The disclosures of the prior applications are hereby incorporated by reference herein in their entirety.

TECHNICAL FIELD

The present invention relates to an acoustic baffle device for sealing a cavity of a vehicle body at a predetermined cross section of the cavity.

BACKGROUND ART

Especially in case of cars being equipped with sun roofs, after having sealed, e.g., the pillar cavities of the vehicle body during car manufacturing process by means of acoustic baffles, drain tubes may be introduced in said cavities additionally, in order to remove and dispose the rain water accumulated around the sun roof. If, however, such an introduction of drain tubes is possible, this step usually damages the baffle, tending thereby to affect or even destroy at least partially its acoustic dampening effect. Furthermore, according to baffle arrangements corresponding to the state of the art, a possible solution for that problem is to include preconstructed gaps, slits or holes in the baffle, capable of and suitable for being opened by any subsequent mechanical touch. A significant drawback of such modified baffle systems is, however, that even slight flow of certain chemical substances as used, e.g., in the stage of electro coating bath (EC-bath) for vehicle body treatment could result in an undesired opening of said gaps, holes or slits, resulting consequently in an undesired deterioration of the acoustic dampening performance of the baffle. Furthermore, when using the acoustic baffle devices according to the state of the art, as a consequence of the above discussed drawbacks it is particularly not possible to introduce a drain tube or a similar device from a larger distance and/or in a non accessible area without any tools and/or additional manual operation.

TECHNICAL PROBLEM AND SOLUTION

There is consequently a strong need for an acoustic baffle system avoiding such disadvantages according to the state of the art, i.e., a device that makes possible the passage of a drain tube (or any other device, electric cables, etc. . . . ) in cavities, preferably pillar cavities of cars after the expansion of sealing material and that furthermore guarantees the unrestricted acoustic performance profile of the baffle when no such tube or similar device is introduced in this pillar. This problem is solved by the technical teaching of the present invention, providing an acoustic baffle device being equipped with a flap assembly that makes possible the passage of a drain tube (or any other, similar device; electric cables, etc. . . . ) during any stage of car manufacturing, preferably after the expansion of sealing material, and that furthermore guarantees the unrestricted, acoustic performance profile of the baffle when no tube is introduced in the pillar, i.e., the flap remains in closed position.

It is therefore the object of the present invention to provide an acoustic baffle device having a flap assembly that makes possible the passage of a drain tube (or any other device, electric cables, etc. . . . ) during any stage of car manufacturing, preferably after the expansion of sealing material and that guarantees furthermore the unrestricted acoustic performance profile of the baffle when no tube is introduced in the cavity. In the latter case, the flap remains in closed position, even when being affected by a flow during any vehicle body treatment step or post manufacturing treatment stages.

According to a preferred embodiment, it is another object of the present invention to provide an acoustic baffle device having a flap assembly that makes possible the introduction of a drain tube from a larger distance, in non accessible area, without any tools or additional operation by hand.

According to the present invention, an acoustic baffle device is provided for sealing a pillar cavity of a vehicle body at a predetermined cross section of the cavity. The device comprises a piece of sealing material being preferably heat expandable, which sealing material is formed in a shape corresponding to but being smaller than the shape of the cross section of the cavity. The sealing material has preferably an activation temperature corresponding to expansion temperature of the material. Preferably, a support element can be provided beneath or around or in the piece of sealing material for supporting it.

The acoustic baffle device is equipped with a "flap assembly", which is preferably secured to the support or co-injected with it. This flap assembly includes a lower neck defining a passage for a drain tube (or any other, similar device) that may be introduced in a pillar. The lower neck has a flap positioned preferably at its end and being secured in closed position by a flexible locking means, preferably a hook. The flap is connected to the lower neck preferably in the area of the lower end of the neck through means that permit the opening and the passage of a tube, preferably by means of a hinge. The flap assembly may preferably also include an upper neck that guides the introduction of drain tube and makes possible the introduction from a larger distance.

DISCLOSURE OF THE INVENTION

The present invention provides an acoustic baffle device for sealing a cavity of a vehicle body at a predetermined cross section of the cavity, comprising a piece of sealing material that is formed in a shape corresponding to but being smaller than the shape of the cross section of the cavity. The acoustic baffle device of the invention is characterized in having a flap assembly having a lower neck defining a passage for a flexible tube or a similar device, said lower neck having a flap secured in closed position by a locking device and being connected to preferably the lower end of the lower neck through means that permit the reversible opening of the above-defined passage. Preferably, the sealing material is heat expandable. More Preferably, the sealing material has an activation temperature corresponding to the expansion of said material, most preferably in the range of between 130° C. and 210° C. Particularly, the sealing material is heat expandable, foaming polyethylene and/or Ethyl-Vinylacetat-Copolymer (EVA).

According to a preferred embodiment, the acoustic baffle device is equipped with a support element provided beneath or around or in the piece of sealing material for supporting the same. More preferably, the support element is based on any heat resistant type of common plastic, preferably polyamide, most preferably polyamide 6, polyamide 6,6, polyamide 11, polyamide 12 or a mixture of themselves. The expression "heat resistant" means here that the material is completely resistant towards a temperature in the range of between 130° C. to 210° C.

Preferably, the flap assembly is secured to the support element or co-injected with it, and the lower neck is positioned at the end of the flap assembly. The locking device securing the flap in closed position is preferably a flexible hook, and the means connecting the flap to preferably the end of the lower neck is preferably a hinge. The flexion of the locking device and opening of the flap is activated by the pressure of the tube between the wall of the lower neck and the locking device itself when the tube is introduced in the assembly.

According to another preferred embodiment of the acoustic baffle device, the flap assembly also has an upper neck that guides the introduction of a drain tube or any similar device from a larger distance, most preferably without any additional, manual operation.

Furthermore, according to the technical teaching of the present invention is provided a flap assembly useful for an acoustic baffle device for sealing a cavity of a vehicle body at a predetermined cross section of the cavity, having a lower neck defining a passage for a flexible tube or a similar device, said lower neck having a flap secured in closed position by a locking device and being connected to the lower neck, preferably in the range of its lower end through means that permit the reversible opening of the above-defined passage. Preferably, the flap assembly is secured to the support element of an acoustic baffle device or co-injected with it, and preferably the lower neck is positioned at the end of the flap assembly. Furthermore, preferably the locking device securing the flap in closed position is a flexible hook, and the means connecting the flap to the lower end of the neck is preferably a hinge.

According to a preferred embodiment, said flap assembly also has an upper neck that guides the introduction of a drain tube or a similar device from a larger distance, more preferably without any, additional, manual operation.

Preferably, the flap assembly is manufactured by an injection moulding process, more preferably it is manufactured in the form of one single, moulded piece. Most preferably, the flap assembly is based on any heat resistant type of common plastic, preferably polyamide, most preferably polyamide 6, polyamide 6,6, polyamide 11, polyamide 12 or a mixture of themselves.

Furthermore, according to the present invention is provided a process for sealing a cavity of a vehicle body at a predetermined cross section of the cavity while permitting the reversible opening of a passage for a flexible drain tube or a similar device, comprising a step of introducing an acoustic baffle device as described above in at least one of the cavities, preferably pillar cavities of a vehicle body. Preferably, in such a process the flap assembly as described above is secured to the support element of the above-described acoustic baffle device or co-injected with it.

Most preferably, the above-described flap assembly of the invention may be used in one of the stages of a process as described in above section.

Based on the technical teaching of the present invention, drain tubes may be assembled in any vehicles, preferably such vehicles being equipped with a sun roof. Drain tubes preferably could be assembled during the so called "body in white step" of baffle assembling (i.e., before expansion of sealing material) or during the assembly as such (i.e., after expansion of sealing material). According to the teaching of the invention, the angle between the axis of the acoustic baffle device (and also the flat assembly, consequently), on the one hand, and the axis of the cavity, on the other hand, can be defined easily by analysing the introduction path of the drain tube. Preferably, the flap assembly of the invention is made of one single moulded piece and can be furthermore designed to be injected without any mobile parts in the mould. Preferably, the expandable sealing material can be overmoulded (dual moulding).

EXAMPLE

Figure 1:
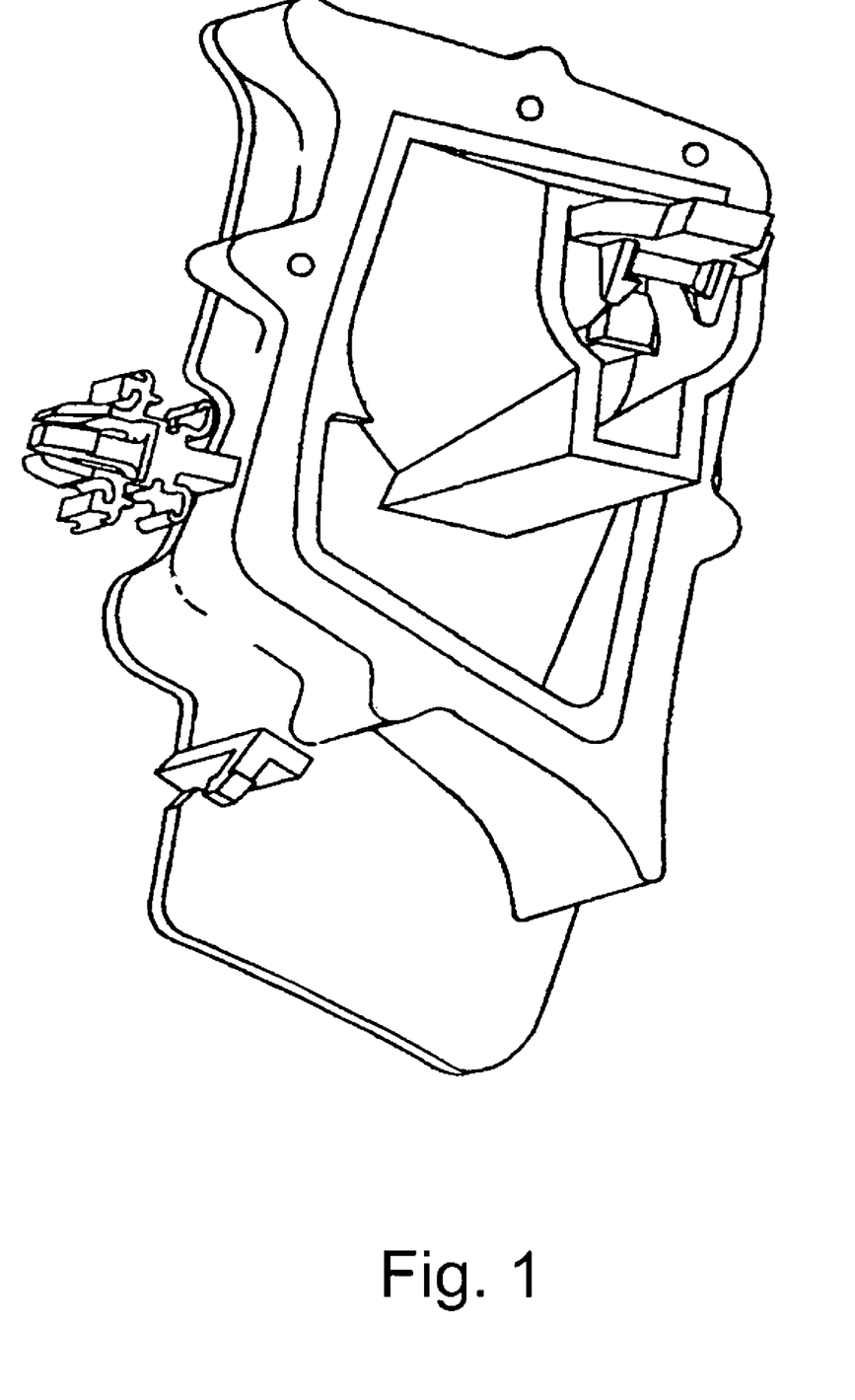
Figure 2:
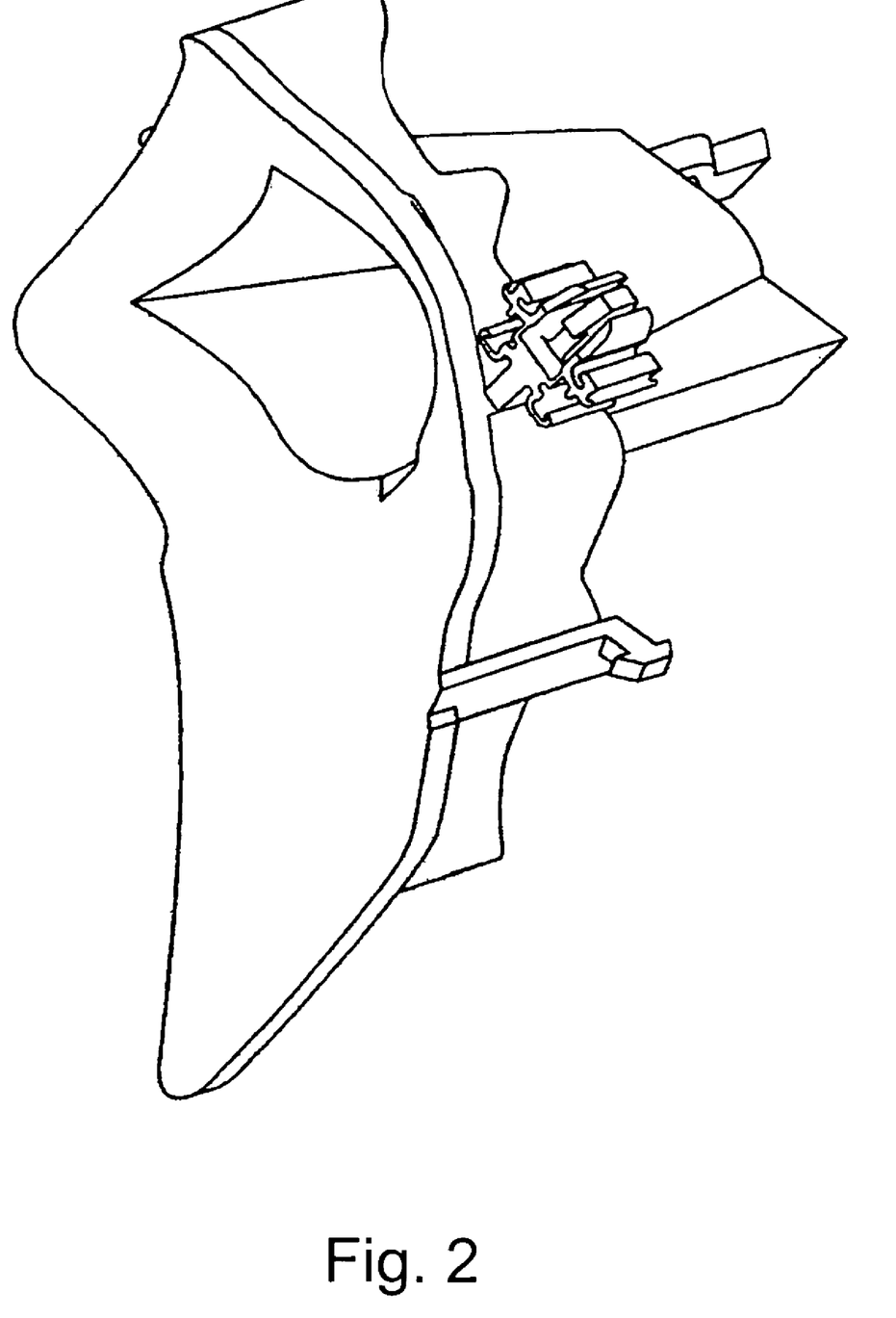
Figure 3:
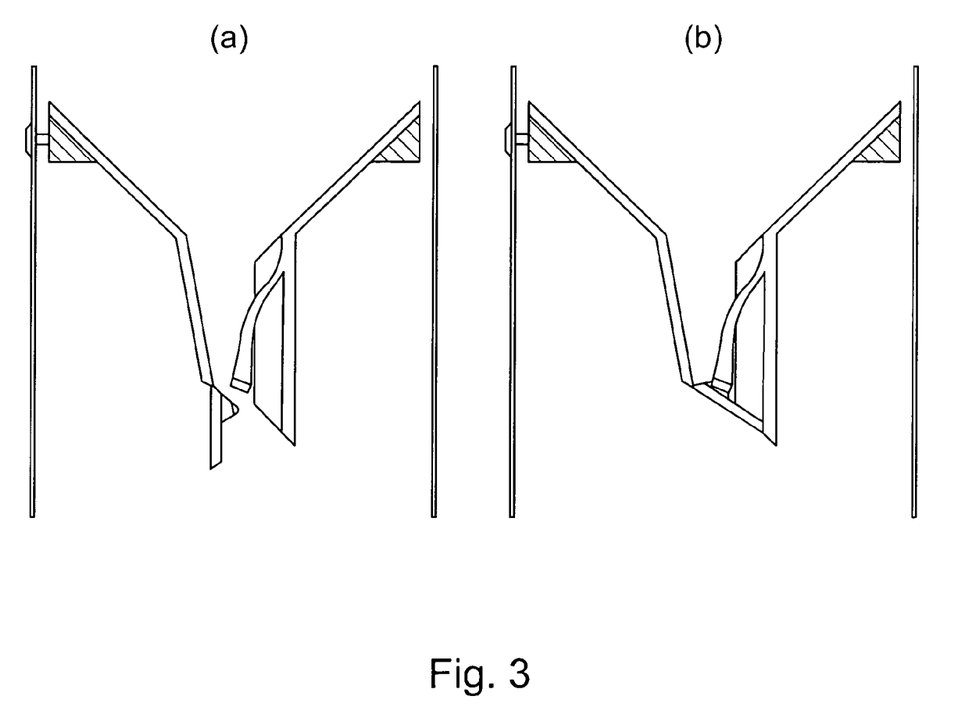
Figure 4:
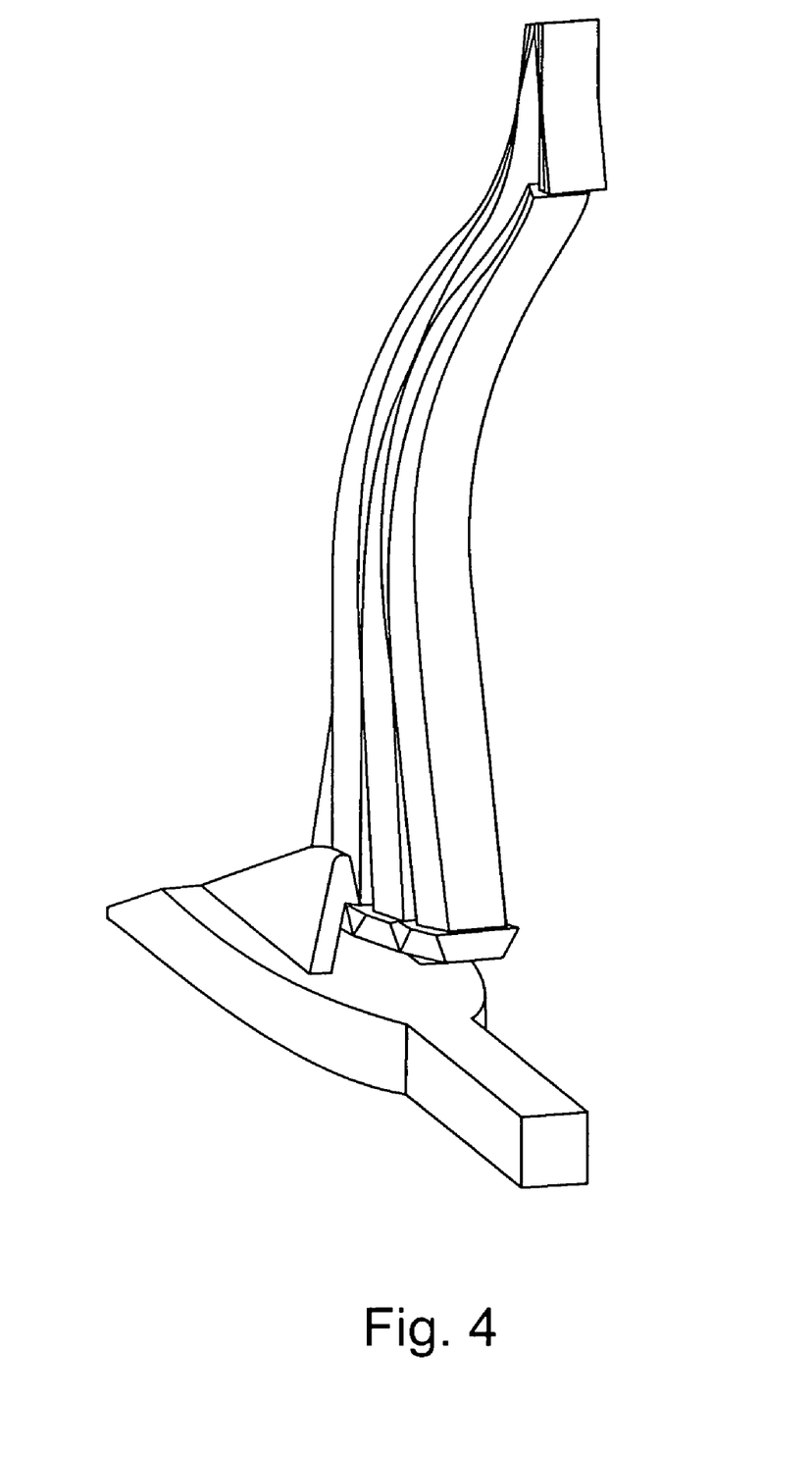
Figure 5:
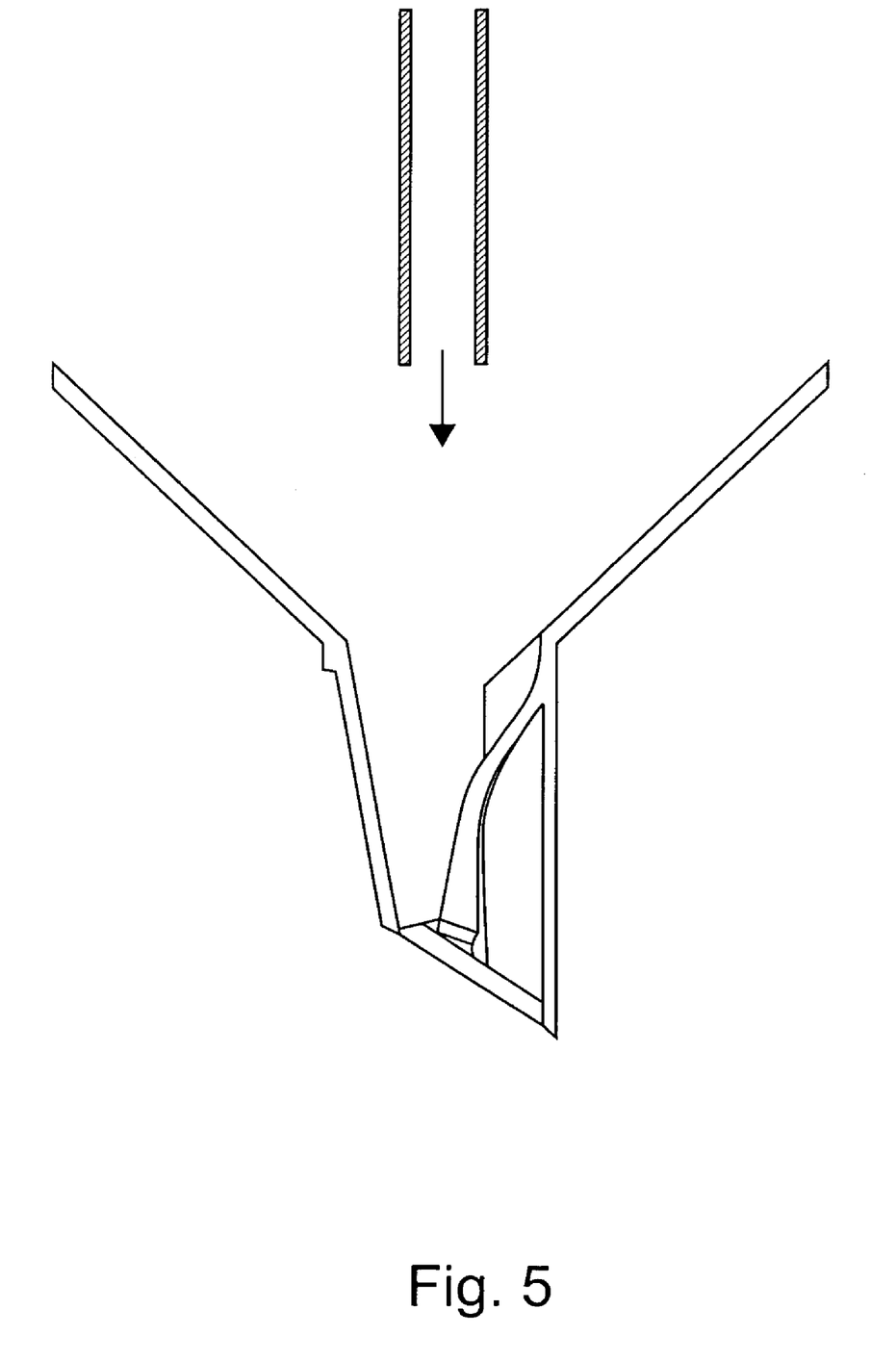
Figure 6:
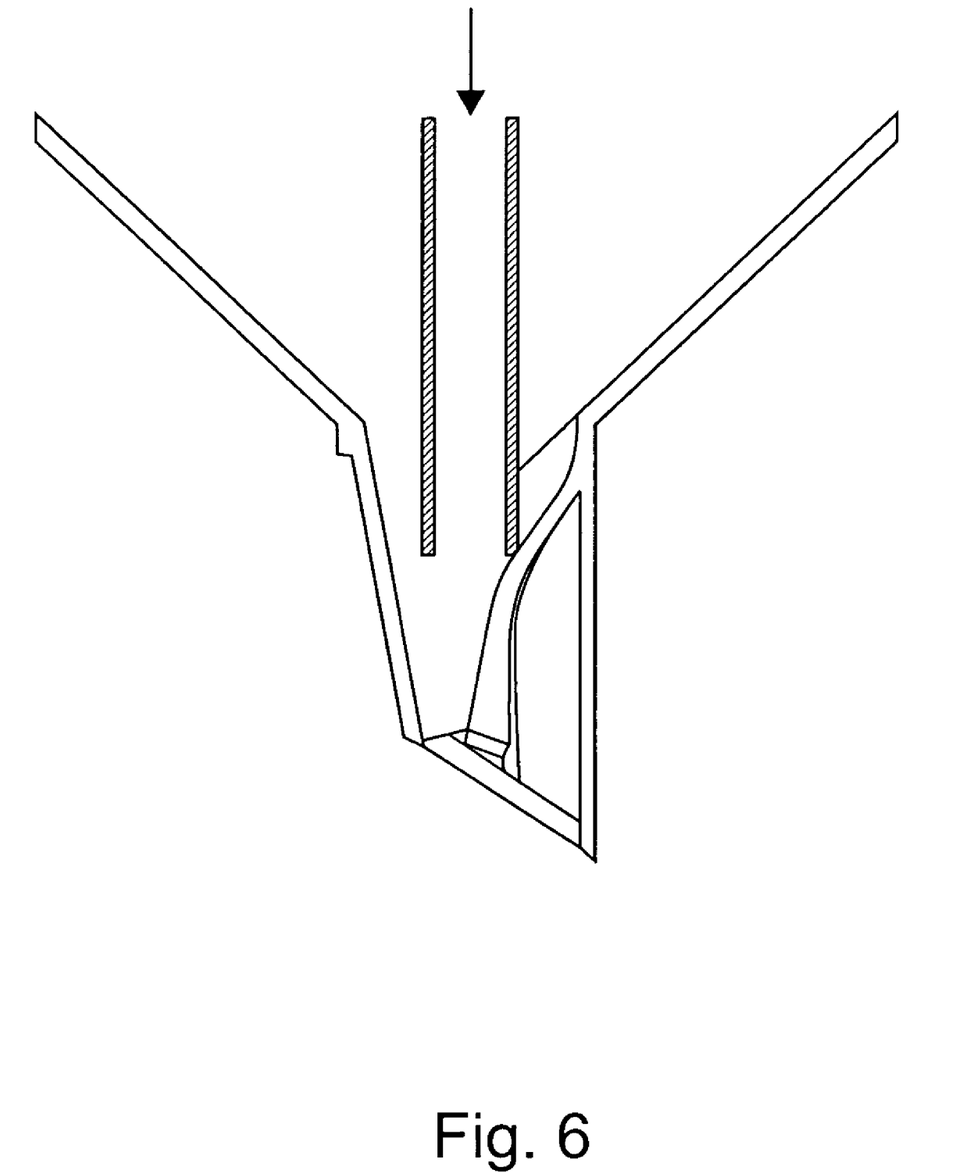
Figure 7:
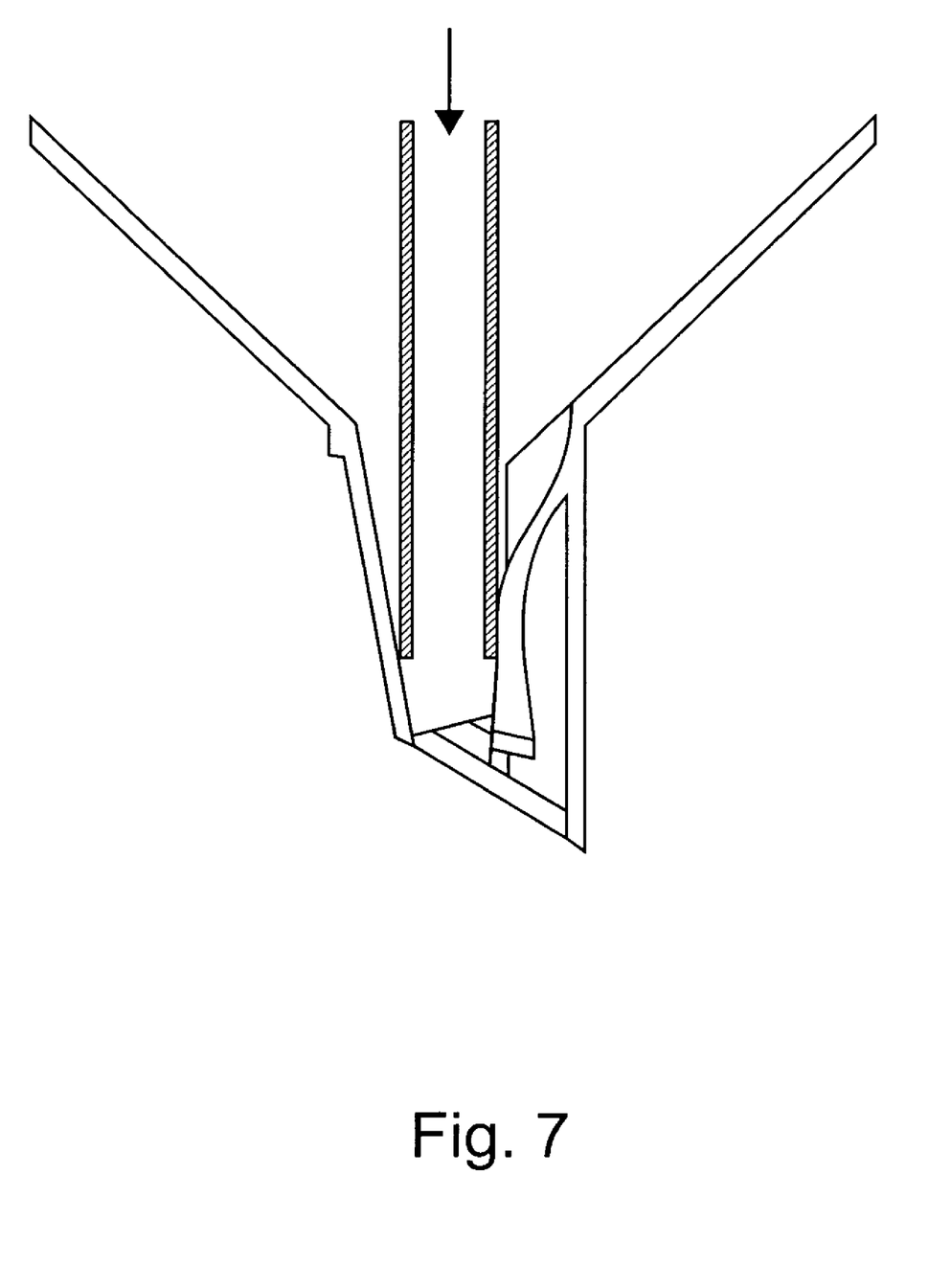
Figure 8:
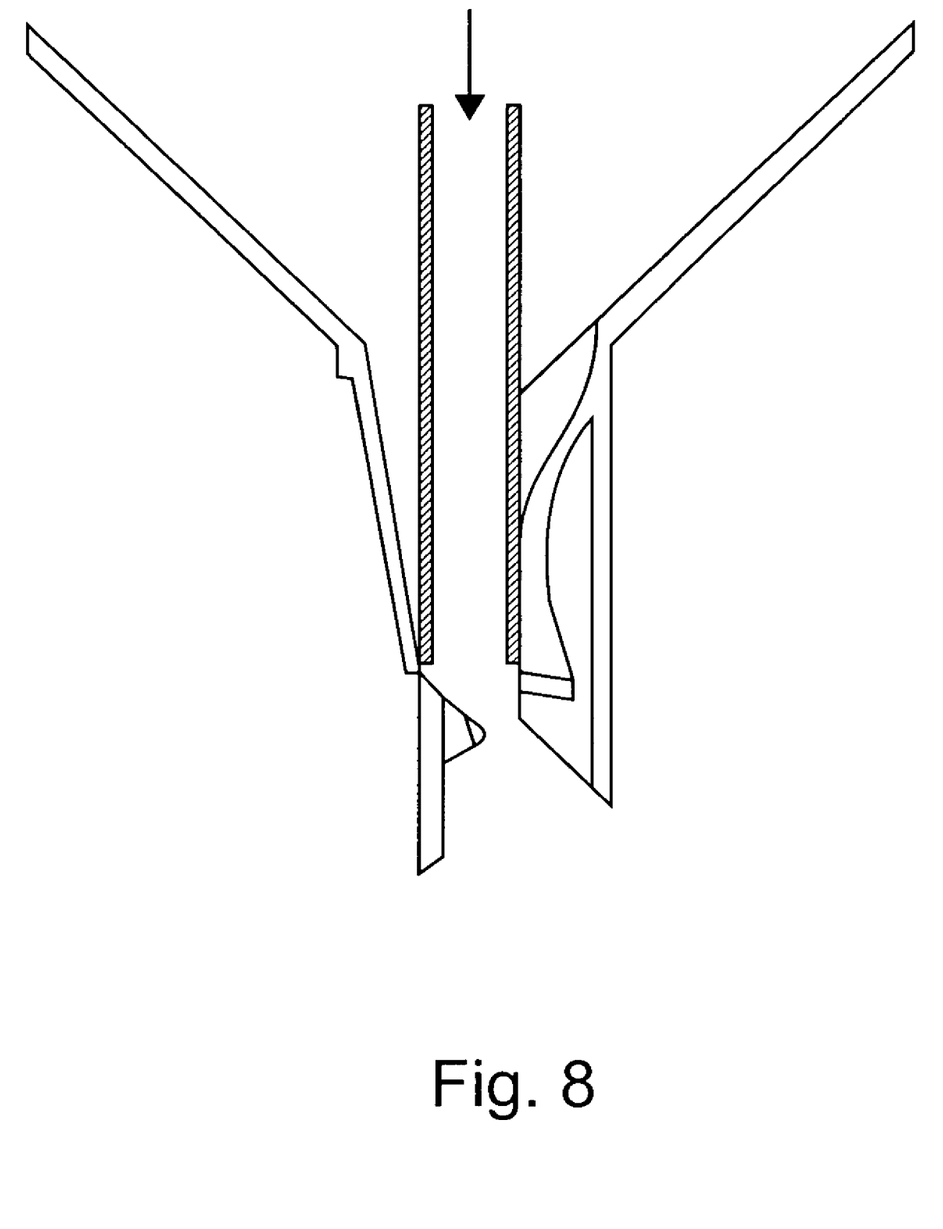
Figure 9:
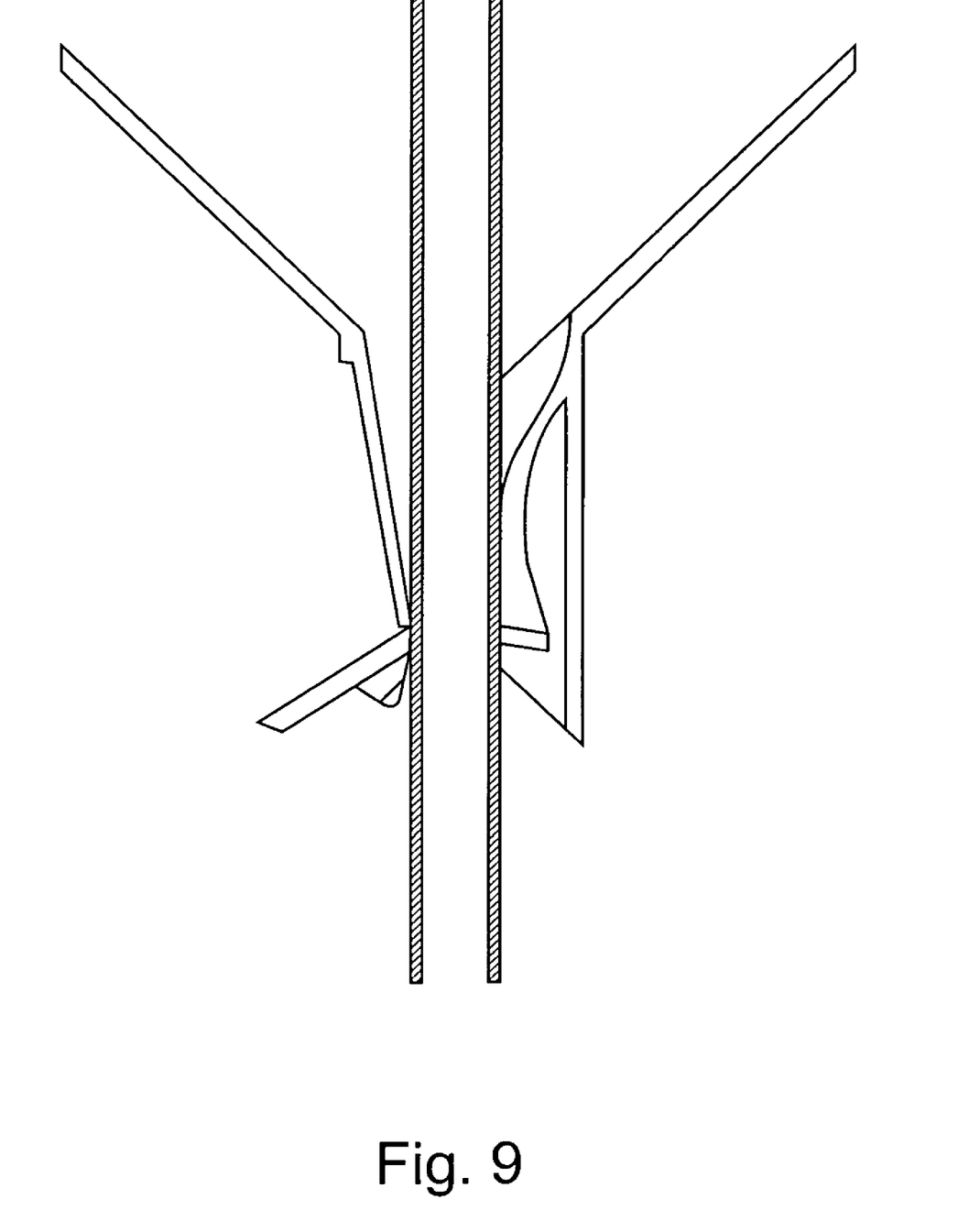

The FIGS. 1 and 2 each provide two schematical, perspective views of a working example for an acoustic baffle device having a flap assembly corresponding to a preferred embodiment of the present invention. The FIGS. 3(a) and (b) each show two schematical cross sections of one and the same working example for a flap assembly according to a preferred embodiment of the present invention. FIG. 3(a) represents the opened state and FIG. 3(b) the closed state of this example for a cross section of a flap assembly according to the invention. FIG. 4 is a schematical, perspective view representing an example for the effect of the locking device in accordance with a preferred embodiment of the flap assembly of the present invention. FIGS. 5 to 9 each represent different, subsequent stages of the introduction of a drain tube into a flap assembly according to an example for a preferred embodiment of the present invention in the form of schematical cross sections. The direction of the movement of the drain tube in FIGS. 5 to 8 is indicated by an arrow.

The invention claimed is:

1. An acoustic baffle device for sealing a cavity of a vehicle body at a predetermined cross section of the cavity, comprising a piece of sealing material that is formed in a shape corresponding to but being smaller than the shape of the cross section of the cavity, having a flap assembly having a lower neck defining a passage for a flexible tube or any similar device, said lower neck having a flap secured in closed position by a locking device and being connected to the lower neck in the range of its lower end through means that permit the opening of the above-defined passage.

2. An acoustic baffle device according to claim 1, wherein the sealing material is heat expandable.

3. An acoustic baffle device according to claim 1, wherein the sealing material has an activation temperature corresponding to the expansion temperature of said material.

4. An acoustic baffle device according to claim 3, wherein the expansion temperature is in the range of 130° C. and 210° C.

5. An acoustic baffle device according to claim 1, wherein the sealing material is heat expandable, foaming polyethylene and/or Ethyl-Vinylacetat-Copolymer (EVA).

6. An acoustic baffle device according to claim 1, which is equipped with a support element provided beneath or around or in the piece of sealing material for supporting the same.

7. An acoustic baffle device according to claim 6, wherein the support element is based on a heat resistant plastic.

8. An acoustic baffle device according to claim 7, wherein the heat-resistant plastic is polyamide.

9. An acoustic baffle device according to claim 6, wherein the flap assembly is secured to the support element or co-injected with the support element.

10. An acoustic baffle device according to claim 1, wherein the lower neck is positioned at the end of the flap assembly.

11. An acoustic baffle device according to claim 1, wherein the locking device securing the flap in closed position is a flexible hook.

12. An acoustic baffle device according to claim 1, wherein the means connecting the flap to the lower neck is a hinge.

13. An acoustic baffle device according to claim 1, wherein the flap assembly also has an upper neck that guides the introduction of a drain tube or any similar device from a larger distance.

14. A flap assembly for an acoustic baffle device for sealing a cavity of a vehicle body at a predetermined cross section of the cavity, having a lower neck defining a passage for a flexible tube or any similar device, the lower neck having a flap secured in closed position by a locking device and being connected to the lower neck in the range of its end through means that permit the opening of the above-defined passage.

15. A flap assembly according to claim 14, wherein the flap assembly is secured to the support element of an acoustic baffle device or co-injected with the support element.

16. A flap assembly according to claim 14, wherein the lower neck is positioned at the end of the flap assembly.

17. A flap assembly according to claim 14, wherein the locking device securing the flap in closed position is a flexible hook.

18. A flap assembly according to claim 14, wherein the means connecting the flap to the lower neck is a hinge.

19. A flap assembly according to claim 14, wherein the flap assembly also has an upper neck that guides the introduction of a drain tube or any similar device from a larger distance.

20. A flap assembly according to claim 14, wherein the flap assembly is manufactured by an injection moulding process.

21. A flap assembly according to claim 14, wherein the flap assembly is manufactured in the form of one single, moulded piece.

22. A flap assembly according to claim 14, wherein the flap assembly is based on a heat resistant plastic.

23. A process for sealing a cavity of a vehicle body at a predetermined cross section of the cavity while permitting the reversible opening of a passage for a flexible drain tube or any similar device, comprising introducing an acoustic baffle device in accordance with claim 1 into the cavity of the vehicle body.

24. A process according to claim 23, wherein a flap assembly is secured to the support element of the acoustic baffle device or co-injected with it, wherein the flap assembly is useful for an acoustic baffle device for sealing a cavity of a vehicle body at a predetermined cross section of the cavity, having a lower neck defining a passage for a flexible tube or any similar device, said lower neck having a flap secured in closed position by a locking device and being connected to the lower neck through means that permit the opening of the above-defined passage.

25. An acoustic baffle device according to claim 8, wherein the polyamide is one of, or a combination of, polyamide 6, polyamide 6,6, polyamide 11, and polyamide 12.

26. An acoustic baffle device according to claim 13, wherein the introduction of the drain tube or any similar device from the larger distance occurs without any additional, manual operation.

27. A flap assembly according to claim 19, wherein the introduction of the drain tube or any similar device from the larger distance occurs without any additional, manual operation.

28. A flap assembly according to claim 22, wherein the heat resistant plastic is polyamide.

29. A flap assembly according to claim 28, wherein the polyamide is one of, or a combination of, polyamide 6, polyamide 6,6, polyamide 11, and polyamide 12.

30. A process according to claim 23, wherein the vehicle body cavity is a pillar cavity.

31. A process according to claim 24, wherein the lower neck having a flap secured in closed position by a locking device is connected to the lower neck in the range of the end of the neck.

* * * * *